United States Patent
Subiry

(10) Patent No.: US 9,807,475 B2
(45) Date of Patent: Oct. 31, 2017

(54) METHODS AND SYSTEMS FOR SENSING AMBIENT CONDITIONS USING PASSIVE RADIO FREQUENCY (RF) DEVICES

(71) Applicant: YRIBUS TECHNOLOGIES, LLC, Jupiter, FL (US)

(72) Inventor: Steven Subiry, Jupiter, FL (US)

(73) Assignee: YRIBUS TECHNOLOGIES, LLC, Jupiter, FL (US)

( * ) Notice: Subject to any disclaimer, the term of this patent is extended or adjusted under 35 U.S.C. 154(b) by 57 days.

(21) Appl. No.: 14/712,215

(22) Filed: May 14, 2015

(65) Prior Publication Data

US 2016/0050469 A1    Feb. 18, 2016

Related U.S. Application Data

(60) Provisional application No. 62/037,310, filed on Aug. 14, 2014, provisional application No. 62/074,261, filed on Nov. 3, 2014.

(51) Int. Cl.
*G08C 19/12* (2006.01)
*G08C 19/16* (2006.01)
*H04Q 9/00* (2006.01)

(52) U.S. Cl.
CPC ........... *H04Q 9/00* (2013.01); *H04Q 2209/40* (2013.01)

(58) Field of Classification Search
CPC ............................ H04Q 2209/40; H04Q 9/00
USPC .................................................... 340/870.17
See application file for complete search history.

(56) References Cited

U.S. PATENT DOCUMENTS

| | | | |
|---|---|---|---|
| 2012/0001496 A1* | 1/2012 | Yamamoto | H01F 27/2876 307/104 |
| 2013/0033393 A1* | 2/2013 | Helbig | G01S 13/755 342/200 |
| 2013/0207670 A1* | 8/2013 | Jones | H03B 5/1817 324/636 |
| 2016/0036261 A1* | 2/2016 | Lenive | H02J 50/10 320/108 |

OTHER PUBLICATIONS

Matsukawa, T., et al., "Heat Flow and Distribution During Induction of General Anesthesia". Anesthesiology, 1995:82: 662-73.
Imamura M., et al., "The Accuracy and Precision of Four Infrared Aural Canal Thermometers During Cardiac Surgery". Acta Anaesthiol Scand. 1998: 42: 1222-1226.
Suleman, Mi, et al., "Insufficiency in a new temporal-artery Thermometer for Adult and Pediatric Patents". Anesth Analog. 2002: 95: 67-71.

(Continued)

*Primary Examiner* — Tanmay Shah
(74) *Attorney, Agent, or Firm* — Thomas | Horstemeyer, LLP

(57) ABSTRACT

Disclosed are various embodiments of systems and methods related to measuring one or more ambient conditions within a confined environment. A telemetry monitoring system comprises a magnetic resonator disposed within a confined environment. The magnetic resonator may be passively energized by an interrogating antenna situated outside the confined environment. Resonant signal responses emitted from the magnetic resonator may be analyzed to determine one or more ambient conditions within the confined environment.

22 Claims, 14 Drawing Sheets

(56) References Cited

OTHER PUBLICATIONS

Lenhardt R., "Relative Contribution of Skin and Core Body Temperatures to Vasoconstriction and Shivering Thresholds During Isoflurane Anesthesia." Anesthesiology, 1999: 91: 422-429.
Lenhardt R., et al., "Mild Intraoperative Hypothermia Prolongs Postanesthetic Recovery." Anesthesiology, 1997: 87: 1318-1323.
Ikeda T., et al, "The Influence of Thermoregulatory Vasomotion and Ambient Temperature Variation on the Accuracy of Core-Temperature Estimates by Cutaneous Liquid-Crystal Thermometers." Anesthesiology, 1997: 86: 603-612.

\* cited by examiner

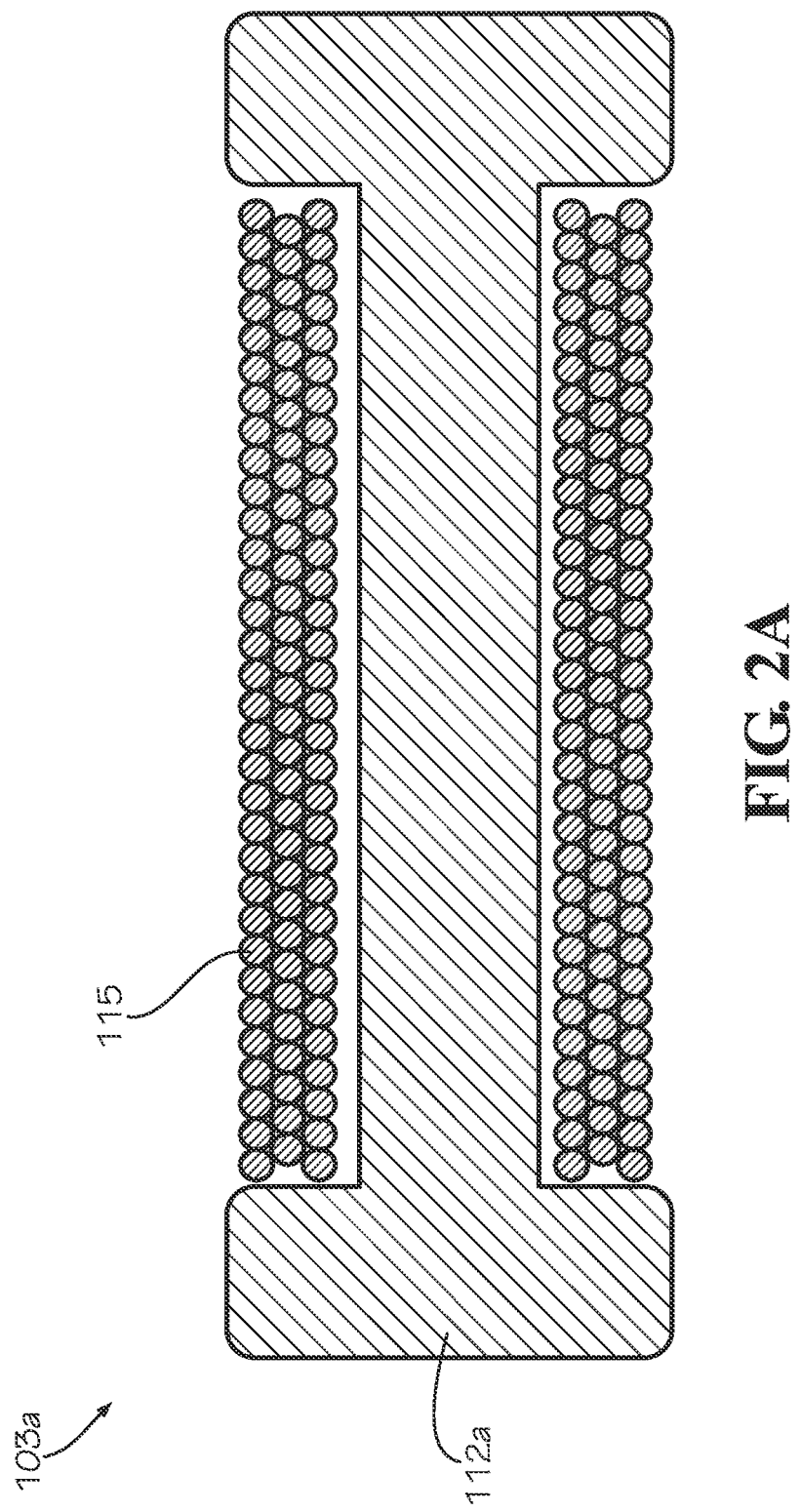

METHODS AND SYSTEMS FOR SENSING AMBIENT CONDITIONS USING PASSIVE RADIO FREQUENCY (RF) DEVICES

CROSS-REFERENCE TO RELATED APPLICATIONS

The present application is a non-provisional application of, and claims priority to U.S. Provisional Application No. 62/037,310 filed on Aug. 14, 2014 and titled "Method to Acquire Temperature and Pressure Measurements of Hazardous Contents Within a Sealed Metal Container Using Passive Low Frequency RF (Radio Frequency) Telemetry," and U.S. Provisional Application No. 62/074,261 filed on Nov. 3, 2014 and titled "Method and Application to Acquire Core Body Temperature Using Passive Low Frequency RF (Radio Frequency)," which are both incorporated by reference herein in its entirety.

BACKGROUND

Temperature and pressure monitoring can be performed to ensure and/or validate the stability of hazardous content and the adequacy of the containment and confinement barriers of a sealed container and corresponding closure system. In addition, body temperature monitoring during most general anesthetics procedures, inpatient and outpatient treatments, and/or other applications facilitates early detection and management of thermoregulatory stresses such as hypothermia and hyperthermia.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 2A-2E are drawings of examples of cross-sectional views of the magnetic resonator of FIG. 1 according to various embodiments of the present disclosure. FIG. 2A is a drawing of a magnetic resonator having a conductor wound around a magnetic core according to various embodiments of the present disclosure. FIG. 2B is a drawing of an example of an encapsulant surrounding a conductor wound around a magnetic core according to various embodiments of the present disclosure. FIG. 2C is a drawing of an example of a magnetic resonator having a balancing capacitor in parallel with the magnetic core according to various embodiments of the present disclosure. FIG. 2D is a drawing of an example of a magnetic resonator having an encapsulant surrounding a conductor wound around a magnetic core according to various embodiments of the present disclosure. FIG. 2E is a drawing of an example of a magnetic resonator having an encapsulant surrounding a conductor etched onto one or more magnetic sheets according to various embodiments of the present disclosure.

DETAILED DESCRIPTION

Figure 1:
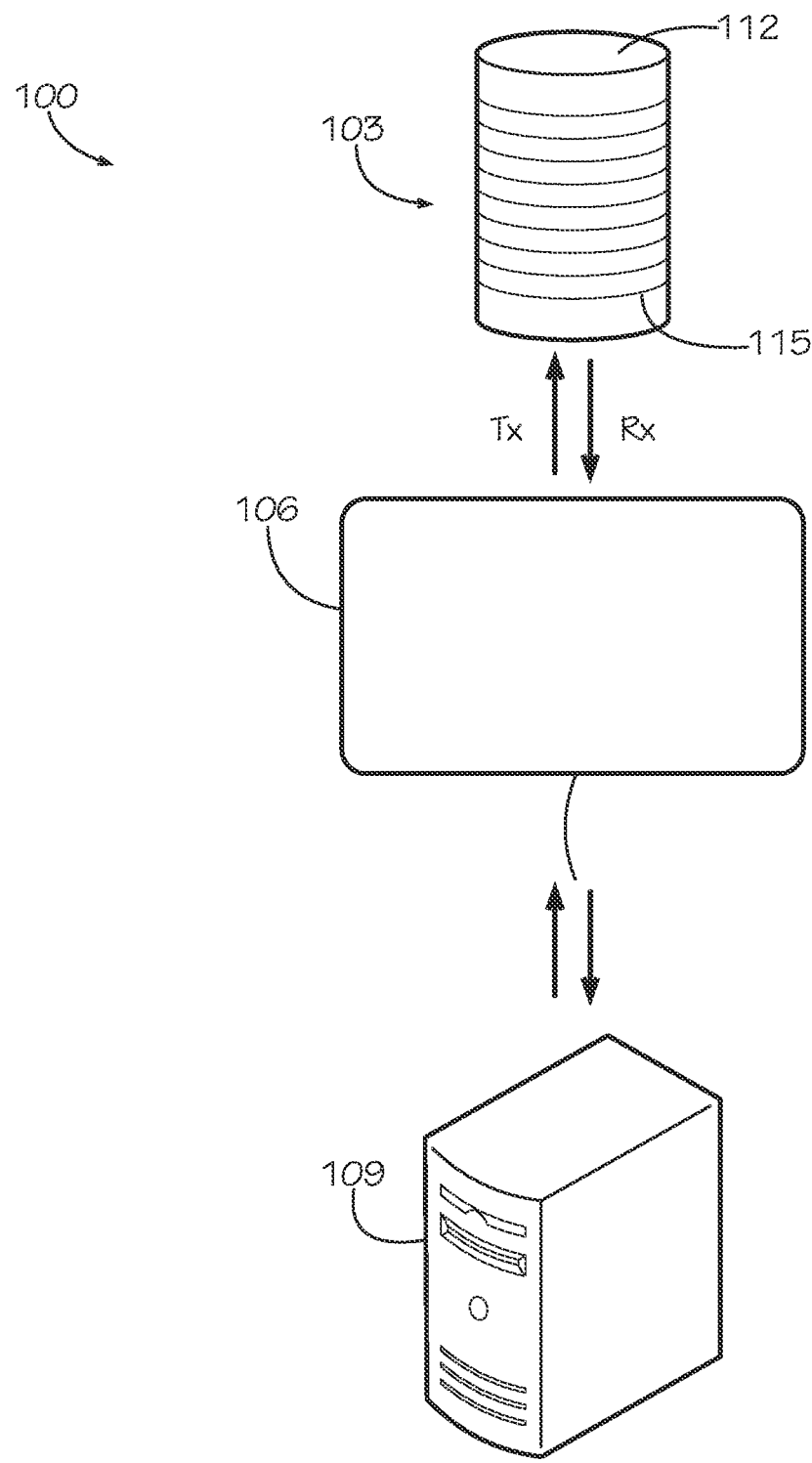
FIG. 1 is a drawing of a telemetry monitoring system having a magnetic resonator, an interrogating antenna, and a computing device according to various embodiments of the present disclosure.

The present disclosure relates to methods and systems for obtaining wireless and remote measurement of temperature, pressure, humidity, and/or other appropriate types of ambient conditions of a confined environment, such as, for example, a sealed container or a human body. Wireless RF monitoring of temperature, pressure, and humidity can help ensure and/or validate ambient conditions inside sealed containers and the adequacy of the containment and confinement barriers and corresponding closure systems. This novel idea comprises a wireless method and application to measure ambient conditions by correlating the shift in resonance frequency from a magnetic sensor placed in or nearby an embodiment as a low cost, non-invasive alternative to wired sensors and wireless sensors that rely on RFID technology. Applications may include wireless monitoring of the contents inside sealed or closed containers in industrial or commercial applications. In addition, this monitoring capability can be used in clinical applications requiring non-invasive means to wirelessly measure human body temperature, in particular, core body temperature to prevent human thermoregulatory stresses leading to hypothermia and hyperthermia and related complications in newborns, infants and adults.

The measurements may be obtained by detecting the resonance frequency shift caused by changes of inter-winding capacitance, quality (Q) factor, and/or magnetization strength changes emitted from a low frequency passive radio frequency (RF) sensor/tag disposed within the confined environment and/or in the vicinity of the confined environment when such sensor response is correlated to environmental parameters. The RF sensor/tag of the present disclosure is designed to withstand the conditions within the confined environment which may include, for example, heat generating, chemically reactive, biological, and/or radiological materials.

The systems and methods of the present disclosure improve the performance and safety of a wide range of high reliability applications such as, for example, remote temperature/pressure monitoring of hazardous contents inside sealed containers, medical applications, such as temperature monitoring (i.e. the monitoring of thermoregulatory conditions in adult and infant patients), consumer products, smart cookware products, and/or remote monitoring of refrigerated shipping containers containing perishable contents. Examples of perishable shipments include seafood, dairy, plants, meat, fruits and vegetables, and live tropical fish.

In one embodiment, radio frequency waves are used to passively power up a magnetic resonator (e.g. RF sensor/tag) such that no internal power or battery is required. Through inductive coupling, a nearby interrogating antenna may energize one or multiple electromagnetic materials of the magnetic resonator disposed within the confined environment. Once the magnetic resonator is energized, the resonance frequency is passively broadcasted back to the nearby coupled interrogating antenna. This resonance frequency response of the magnetic resonator is highly dependent on and can be correlated to the nearby physical parameters (i.e., temperature, pressure, humidity, etc.) in the environment around the magnetic resonator. In some embodiments, the interrogating antenna is connected, wired or wirelessly, to a computing device that processes the monitored signals associated with the measurement of ambient conditions within the contained environment. The computing device may also be configured to generate a notification regarding measurements that are outside a predefined threshold. For example, if a pressure reading of a sealed container including a hazardous material is outside a predefined threshold, a notification may be sent to a user in order to notify the user of the abnormal pressure reading. In the following discussion, a general description of the system and its components is provided, followed by a discussion of the operation of the same.

With reference to FIG. 1, shown is a drawing of an example of a telemetry monitoring system 100 according to various embodiments of the present disclosure. The telemetry monitoring system 100 comprises a magnetic resonator 103, an interrogating antenna 106, and a computing device 109. The magnetic resonator 103 may comprise an RF tag, an RF sensor, and/or any other appropriate type of RF device. The magnetic resonator 103 may comprise a magnetic core 112, a conductor 115, and an encapsulant 200 (FIGS. 2B-2E). In some embodiments, the conductor 115 substantially surrounds at least a portion of the magnetic core 112 in a typical LC circuit configuration, tank circuit, and/or other appropriate configuration.

In some embodiments, the magnetic core 112 may comprise a powder core (e.g., powder iron, MPP, Sendust, etc.), a ferrite core (e.g., Nickel-zinc ferrite (NiZn), Manganese-zinc ferrite (MnZn), etc.), a metglas core, an amorphous material, permalloy, and/or other type of appropriate material that exhibits permeability characteristics and magnetostriction property required to produce temperature and/or pressure dependent frequency shifts that are detectable wirelessly by a loop antenna. Accordingly, the magnetic core 112 may comprise a variety of core materials, permeability values, and shapes as appropriate. The magnetic core 112 may comprise a variety of shapes such as, for example, a rod shape, a beam shape, a drum shape, a dumbbell shape, a bone shape, and/or any other type of appropriate type of shape. In one non-limiting example, the magnetic core 112 comprises a powder core material. With powder material, the air gap in the magnetic core 112 will be distributed evenly across the whole magnetic core 112 instead of a gapped part which is the case in a standard ferrite core. The distributed air gap will give the material a better temperature stability as well as lower flux leakage. In some embodiments, the magnetic core 112 comprises one or more magnetic core sheets. In some embodiments, the magnetic core 112 is not magnetically shielded. In other embodiments, the magnetic core 112 is magnetically shielded.

The conductor 115 may comprise a wire coil that is wound around at least a portion of the magnetic core 112. In some embodiments, the wire coil may be etched onto the magnetic core 112. In a preferred embodiment, the conductor 115 is a high temperature rated magnet wire. The conductor 115 disposed about the magnetic core 112 may comprise a predefined number of turns and predefined wire size gages to achieve the desired resonance frequency, Q factor, and capacitive characteristics that would couple to the interrogating antenna 106 at the desired telemetry signal strength and RF wave forms. As such, the number of wire turns and inductance value ($A_L$ value) may be tuned to achieve a specific resonance or center frequency value or response. It is during this resonance frequency when the magnetic resonator 103 is capable of storing and transferring the maximum amount of energy or amplitude.

In some embodiments, the magnetic resonator 103 comprises an encapsulant 200 (FIGS. 2B-2E) that substantially surrounds the magnetic core 112 and conductor 115. In some embodiments, the encapsulant 200 may comprise a non-organic protection layer, coating, or encasing barrier designed to protect the magnetic resonator 103 from any hazardous nature of the contents within the confinement, while exhibiting physical properties compatible with the magnetic resonator monitoring performance objectives. The encapsulant 200 may comprise high thermal expansion glass forms and/or ceramics, to sustain the harsh environments inside a sealed container with hazardous contents. The encapsulant 200 exhibits physical properties directly compatible with the functions and performance of the magnetic resonator 103 and the specific application (e.g. core body temperature monitoring, hazardous materials monitoring, etc.). In some embodiments, the encapsulant 200 comprises a bioinert material allowing the magnetic resonator 103 to be in direct contact with skin, and also be ingestible and/or implantable.

The magnetic resonator 103 may be disposed within a sealed container (e.g. nuclear fuel cask, paint can, etc.), a body (e.g. mammal, reptile, etc.), a shipping container (e.g., temperature-controlled container of perishables), a cooking product, and/or any other type of contained environment. For example, if the magnetic resonator 103 is disposed within a sealed container, such as, for example, a nuclear fuel cask 600 (FIGS. 6 and 7), the magnetic resonator 103 may be attached to an interior wall of the cask 600 associated with the storage of nuclear fuel. In another non-limiting example, the magnetic resonator 103 may be attached to esophageal tube 900 (FIG. 9) such that when inserted into a surgical patient, the magnetic resonator 103 attached to the esophageal tube 900 may transmit to the interrogating antenna 106 resonance frequency information pertaining to the environmental conditions within the body of the surgical patient.

The magnetic resonator 103 serves as an onboard magnetically tuned resonator sensor capable to collect and transmit real time feedback of the ambient conditions from within a sealed compartment, containment or embodiment, as long as a known correlation exists between those physical parameter and the resonance frequency response of the resonator. In some embodiments, the magnetic resonator 103 may comprise an embedded secondary resonant element to allow pressure and humidity dependent resonance frequency shifts. An advantage of adding an additional coupled coil is that a different magnetic core material and coil configuration can be used achieve a different resonance frequency profile as the primary coupled coils, which will be strictly dedicated to temperature measurements. The magnetic resonator 103 can be manufactured to contain multiple coils configurations and magnetic materials for achieve the desire temperature, pressure and humidity profile measurements.

Figure 2B:
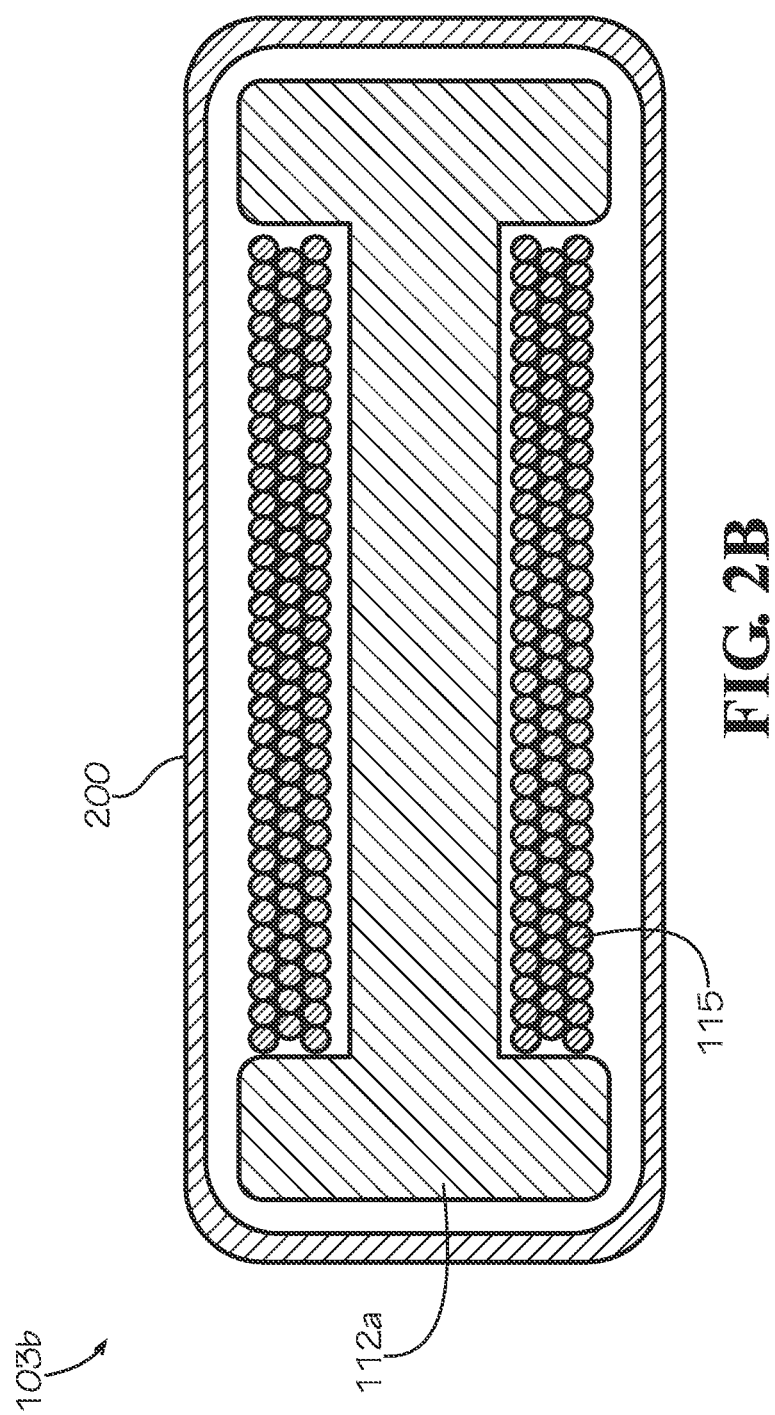
Figure 2C:
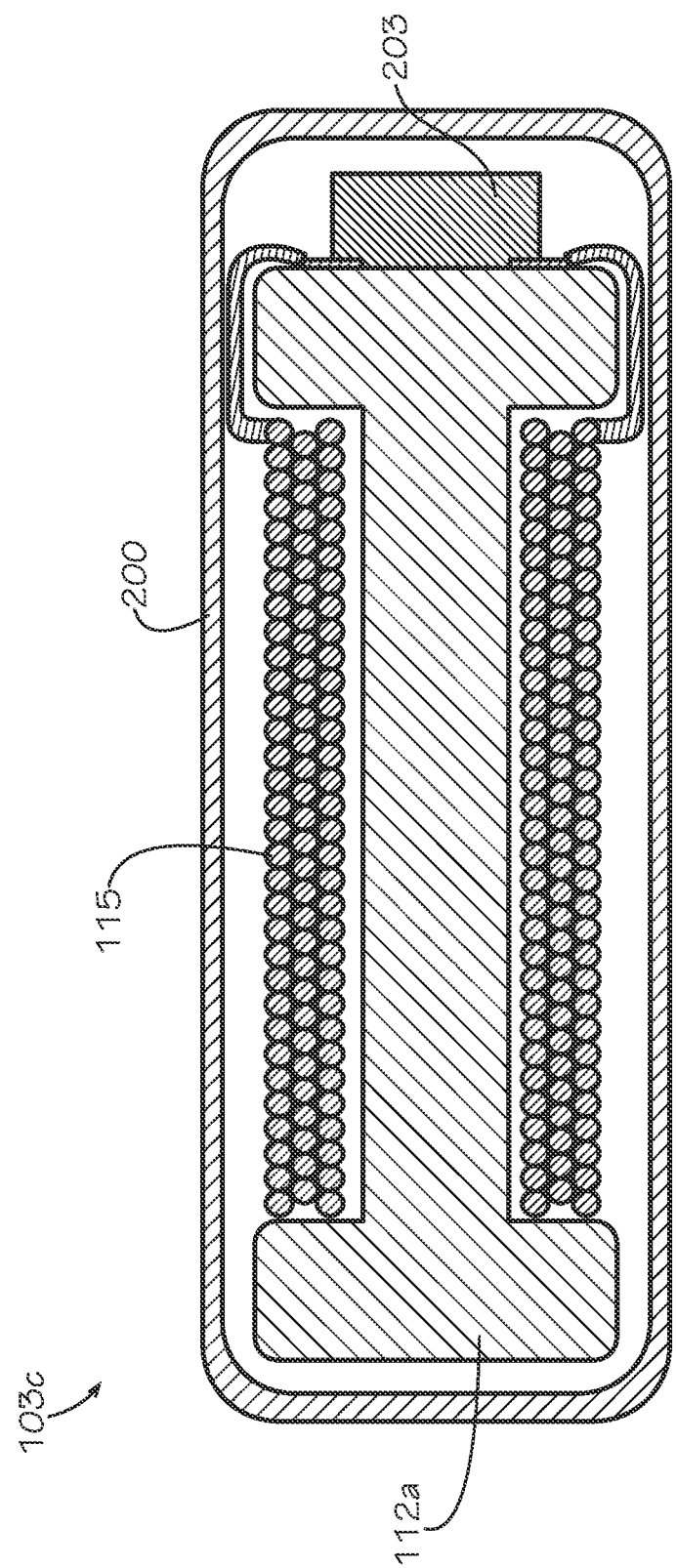

FIG. 2A illustrates an example of a drawing of a cross-sectional view of a magnetic resonator 103a according to various embodiments of the present disclosure. The magnetic resonator 103a comprises the conductor 115 wrapped around the magnetic core 112a. FIG. 2B illustrates an example of a drawing of a cross-sectional view of a magnetic resonator 103b according to various embodiments of the present disclosure. The magnetic resonator 103b of FIG. 2B differs from the magnetic resonator 103a of FIG. 2A in that the magnetic resonator 103b further comprises the encapsulant 200. FIG. 2C illustrates an example of a drawing of a cross-sectional view of a magnetic resonator 103c. The magnetic resonator 103c differs from the magnetic resonator 103b of FIG. 2B in that the magnetic resonator 103c further comprises a capacitor 203 coupled in parallel with the magnetic core 112a and the conductor 115 configuration.

The capacitor 203 comprises at least one of a balancing capacitor or a matching capacitor. The capacitor 203 may be included as part of the magnetic resonator 103c to address unwanted resonance frequency shifts affecting the magnetic resonator 103c. The unwanted frequency shifts are mostly caused by environmental conditions that can diminish ability of the magnetic resonator 103c to communicate or to magnetically couple more effectively to the interrogating antenna 106 at a pre-determined inductance value and, thus, lower the signal or response performance of the magnetic resonator 103c exhibited in the form of power dispersion to nearby structures. The capacitor 203 addresses unwanted parasitic capacitance and intertwining capacitance changes (from both conductor 115 and the magnetic core 112). The capacitor 203 may also generate a higher Q state to achieve the desired bandwidth (as narrow or tightest bandwidth the better). The higher the Q factor of the magnetic resonator 103c, the higher the energy response or RF signal response at resonance. This is important to passively activate the magnetic resonator 103c and achieve a good response in harsh environmental conditions such as temperature, fluids near metals, etc. while maintaining adequate signal to noise ratio (SNR). The capacitor 203 may be used to allow linear resonance frequency shifts as a result of the temperature dependence and linearity characteristics of the materials of the magnetic resonator 103c which control the impedance and core permeability, while preserving the system's immunity to unwanted offending attenuation factors, such as metals and fluids, etc.

Figure 2D:
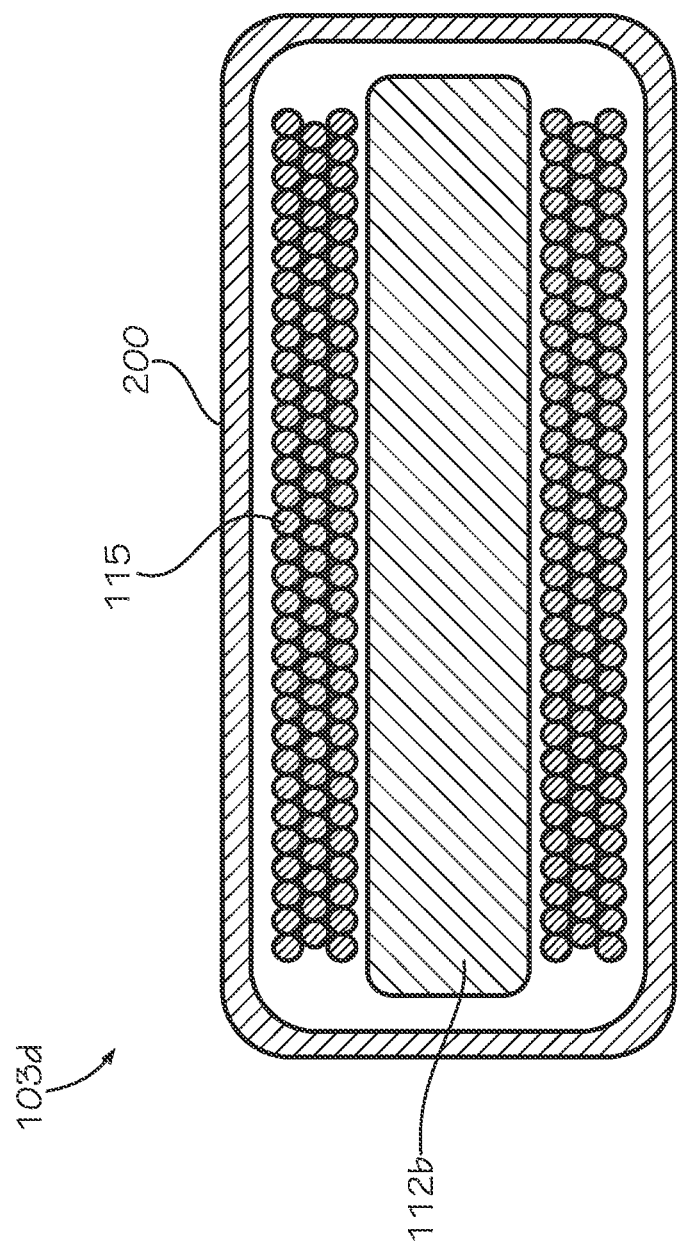
Figure 2E:
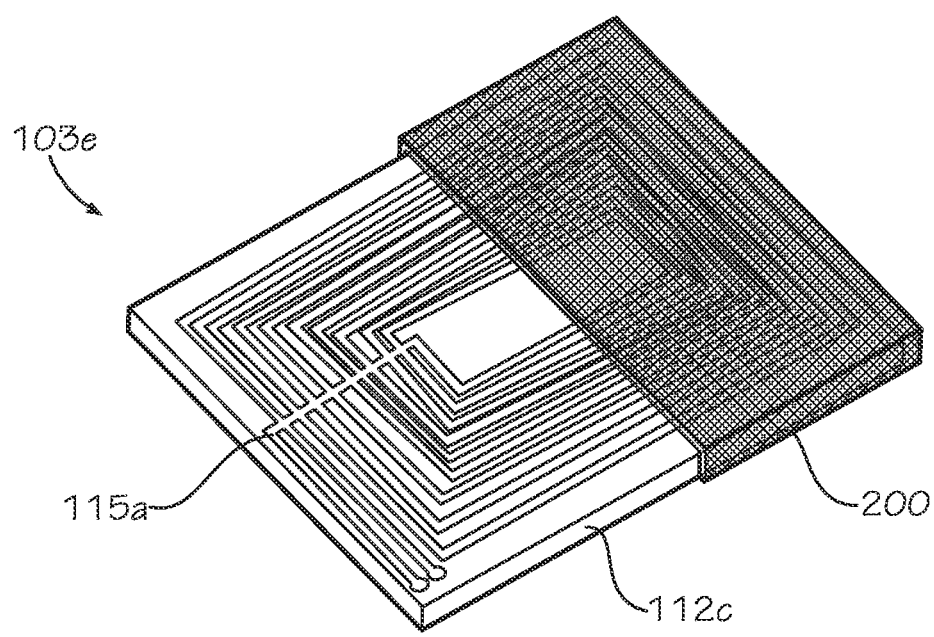

FIG. 2D illustrates an example of a drawing of a cross-sectional view of a magnetic resonator 103d according to various embodiments of the present disclosure. The magnetic resonator 103d differs from the magnetic resonator 103b of FIG. 2B in that the magnetic core 112b of the magnetic resonator 103d is rod-shaped while the magnetic core 112a of the magnetic resonator 103b is dumbbell shaped. FIG. 2E illustrates an example of a drawing of a magnetic resonator 103e according to various embodiments of the present disclosure. The magnetic resonator 103e differs from the magnetic resonator 103a, 103b, 103c, and 103d of FIGS. 2A-D in that the magnetic core 112c comprises one or more pressed magnetic core sheets etched with the conductor 115a.

Figure 3:
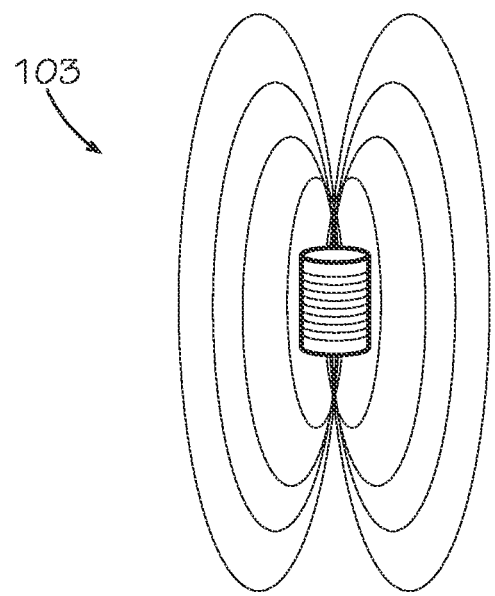
FIG. 3 is a drawing of an example of a magnetic field associated with the magnetic resonator of FIG. 1 according to various embodiments of the present disclosure.
Figure 4:
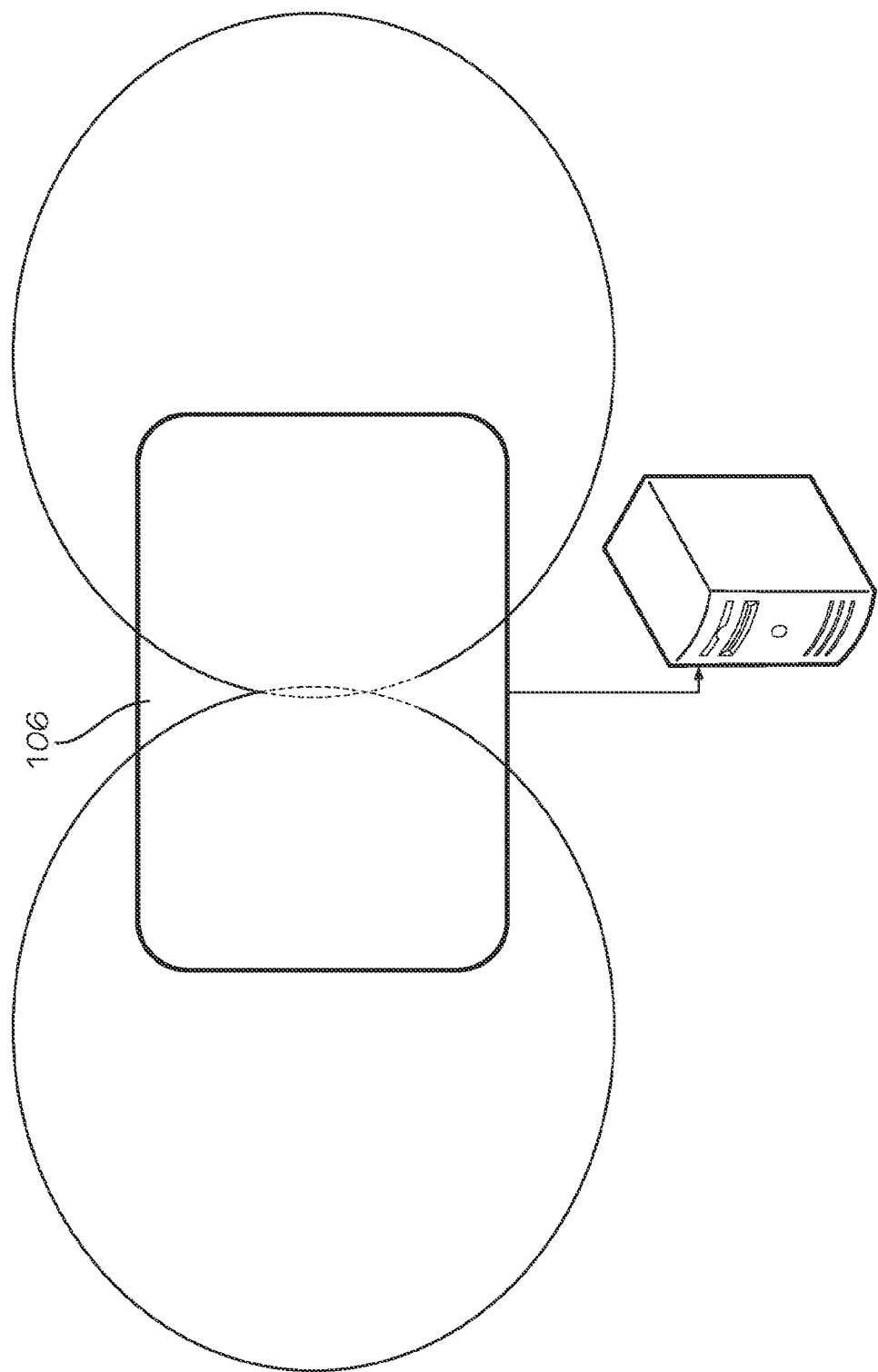
FIG. 4 is a drawing of an example of a magnetic field associated with the interrogating antenna of FIG. 1 according to various embodiments of the present disclosure.

Turning back to FIG. 1, the interrogating antenna 106 may comprise a single loop antenna or any other appropriate type of antenna that is configured to transmit a pulsed RF power signal for exciting the magnetic resonator 103. The interrogating antenna 106 may be further configured to receive the resonance frequency response associated with the environmental parameters of the confined environment (e.g. container, body, etc.) of which the magnetic resonator 103 is disposed within. The interrogating antenna 106 may be positioned near the outside of the confined environment (e.g. container, body, etc.) of the magnetic resonator 103 such that the interrogating antenna 106 and the magnetic resonator 103 are within the appropriate detection and inductive coupling range needed based on the type of application. As such, the shape and/or dimensions of the interrogating antenna 106 may vary as appropriate depending on the detection and inductive coupling range needed. FIGS. 3 and 4 illustrate examples of drawings of the magnetic field path of the magnetic resonator 103 (FIG. 3) and the interrogating antenna 106 (FIG. 4).

The interrogating antenna 106 is configured to emit energy pulses for exciting the magnetic resonator 103. Depending on the particular application, the telemetry approach of the present disclosure can be achieved using either low frequency or high frequency signals. Low frequency RF signals transmit well in the presence of fluids and metals, and can penetrate and receive resonance frequency signals from a magnetic resonator 103 within the confinement of a sealed embodiment, such as, for example, a sealed container (metal or non-metal), a sealed package (metal or non-metal), a human body, an animal, food, and/or other appropriate type of containment where a signal has to go through permeable matter. In some embodiments, the interrogating antenna 106 may be configured to emit energy pulses in a tight low frequency (LF) that are above about 10 kHz and below about 300 kHz. In other embodiments, the magnetic resonator 103 can be tuned to perform at frequencies below 10 kHz depending on the application since a magnetic resonator 103 tuned to perform at a lower frequency may utilize magnetic fields for communication which are more suitable for harsh environments. Low frequency RF signals are largely unaffected by the presence of fluids, non-ferrous metals, and most electromagnetic (EM) noise sources. High frequency RF can also be used for similar applications. However, high frequency RF signals may experience significant signal attenuation, degradation, or interferences when surrounded by fluids and metals.

The computing device 109 may be coupled to the interrogating antenna via a wired connection or wirelessly. The computing device 109 is configured to generate the appropriate signals that are transmitted from the interrogating antenna 106 for energizing the magnetic resonator 103. The computing device 109 may further be configured to receive the resonance frequency response that is received by the interrogating antenna 106 from the magnetic resonator 103. The resonance frequency responses are processed by the computing device 109 to determine environmental conditions within the confined environment (e.g., sealed container, human body, etc.).

Various applications and/or other functionality may be executed in the computing device 109 according to various embodiments. Also, various data is stored in a data store 1203 (FIG. 12) that is accessible to the computing device 109. The data store 1203 may be representative of a plurality of data stores 1203 as can be appreciated. The data stored in the data store 1203, for example, is associated with the operation of the various applications and/or functional entities described below.

Next, a general description of the operation of the various components of the telemetry monitoring system 100 is provided. To begin, the interrogating antenna 106 transmits pulsed energy across a wideband frequency range and receives responses above the noise floor from a tuned magnetic resonator 103 as it approaches resonance/center frequency. A frequency sweep function may be used to detect the resonance frequency of the magnetic resonator 103. This is achieved by the interrogating antenna 106 transmitting pulsed power signals to the magnetic resonator 103 during transmit cycle ($T_x$) and then during receive cycle ($R_x$), listening for a signal back from the magnetic resonator 103. The interrogating antenna 106 transmit/receive process is possible since the magnetic core 112 of the magnetic resonator 103 allows for energy storage during the antenna transmit or transmit cycle ($T_x$). When the magnetic resonator 103 is fully energized, the magnetic resonator 103 releases the stored energy back to the interrogating antenna 106 during the antenna's receiving or receive cycle ($R_x$). The energy magnitude stored and released by the magnetic resonator 103 is higher as the antenna frequency is closer the resonance frequency of the magnetic resonator 103. When the interrogating antenna 106 is transmitting closer to the resonance frequency of the magnetic resonator 103, a significant increase in the signal response of the magnetic resonator 103 is released back to the interrogating antenna 106. The interrogating antenna 106 will continue to execute the $T_x/R_x$ frequency sweep algorithm program until it passes the signal responses of the magnetic resonator 103 peak at resonance frequency. Depending on the Q factor of the magnetic resonator 103, the interrogating antenna 106 may experience a sudden signal response increase from the magnetic resonator 103 as it approaches resonance frequency followed by an immediate signal response drop as it passes the resonance frequency of the magnetic resonator 103.

In some embodiments, the magnetic resonator 103 comprises a high permeability core (e.g., 5,000μ, non-air cores, greater than 1, etc.), which allows higher inductance with fewer turns, and helps achieve higher Q values which can significantly discriminate offending noise interferences. High permeability allows for better coupling variability. Specifically, high permeability magnetic cores provides a more easy path for flux in order to facilitate flux linkage, or inductive coupling, between a low frequency RF antenna and the low frequency magnetic resonator 103. The high permeability magnetics core 112 serves as a "magnetic bus bar" to connect the interrogating antenna 106 to the magnetic resonator 103. The use of high permeability magnetics materials better harness the linearity of temperature and/or pressure dependent resonant frequency shifts properties or frequency variation profiles that can be broadcasted by the low frequency magnetic resonator 103 and interrogating antenna 106. Resonance frequency variation profiling is possible be using temperature and/or pressure sensitive magnetic materials which allows the inductive and capacitive properties of the magnetic resonator 103 to change yielding to stable frequency shifting linearity behaviors with changes in ambient conditions parameters (temperatures, pressure, and humidity.)

In addition, high permeability cores comprise temperature dependency properties. The permeability value of the magnetic core 112 increases as the ambient temperature increases, which increases the inductance value of the magnetic resonator 103, hence reducing the resonance frequency of the magnetic resonator 103 per the below resonance frequency equation:

$$f(T) = \frac{1}{2\pi\sqrt{L_S C_S(T)}}$$

This linear positive temperature coefficient property of the magnetic core 112 is not present in an "air core" sensor, since magnetic permeability of free space is not effected by temperature. As such, the same coil without a magnetic core would make a magnet that does not vary with temperature. The temperature dependency on the material permittivity results in a change of the capacitance and a shift in the resonance frequency of the sensor per the above resonance frequency equivalent. This variation can be captured wirelessly allowing for temperature monitoring in rotating components. Resonance frequency is then correlated to its respective temperature value using a correlation table stored in the data store 1203 of the computing device 109.

Since the magnetic resonator 103 is passive and completely de-energized during its "no-transmit state," no magnetic amplitude responses are possible between the interrogating antenna 106 and the magnetic resonator 103. As such, data can only be transmitted and received when the interrogating antenna 106 and the magnetic resonator 103 are fully energized, and the interrogating antenna 106 can start detecting responses (amplitude) from the magnetic resonator 103. A passive magnetic resonator 103 is suitable for sealed containers and can be in close contact to hazardous contents, which makes battery assisted devices not suitable for these environments.

When the interrogating antenna 106 receives the necessary number of amplitude samples from the magnetic resonator 103 across the determined low frequency spectrum, a simple signal processing function can be performed via the computing device 109 to identify the center frequency change that correlates to the respective temperature values. This signal processing algorithm can be performed via the computing device 109 using known mathematical techniques such as, for example, Laplace transforms and/or other known digital signal processing/filtering techniques used to produce useful thermometry and/or other environmental data.

Figure 5:
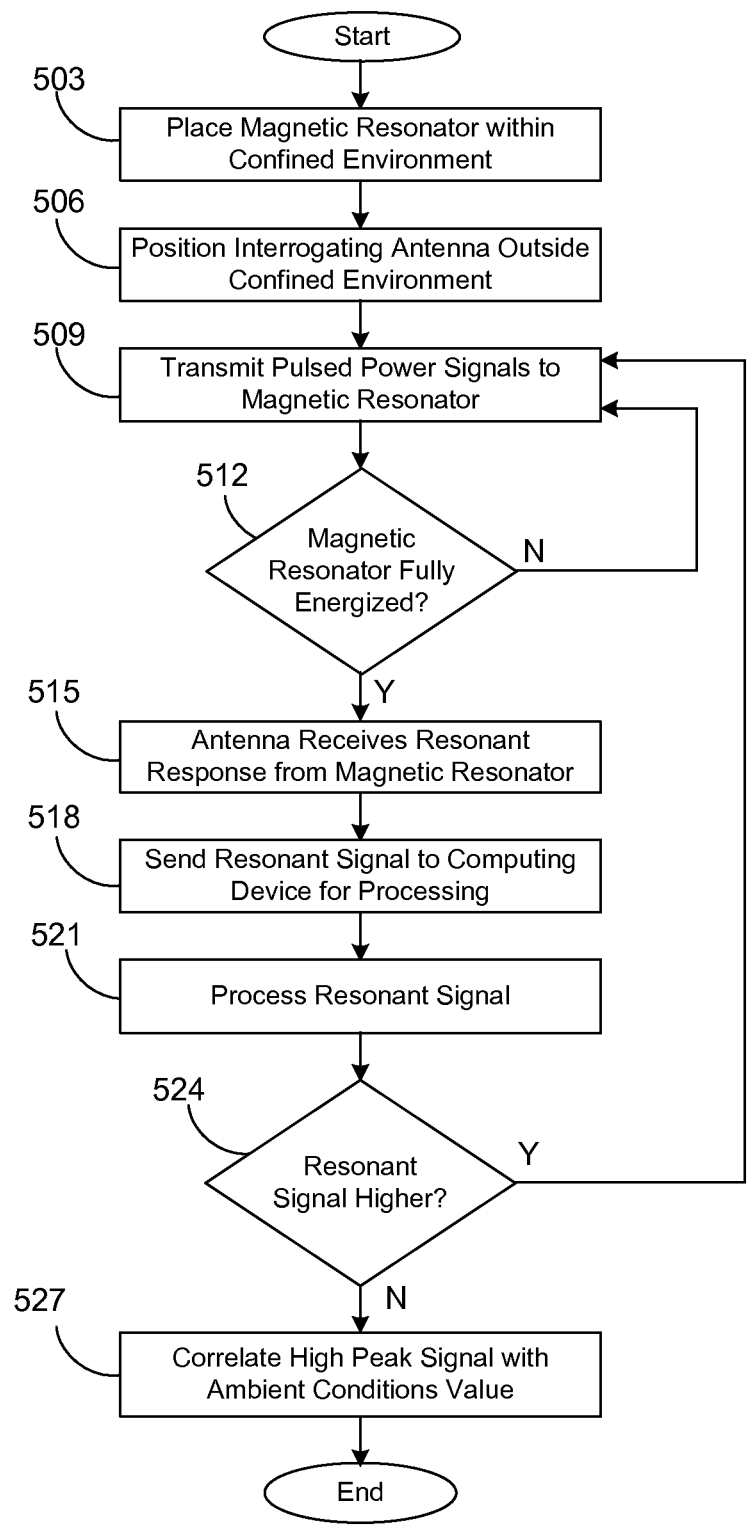
FIG. 5 is a flowchart illustrating one example of functionality implemented in the telemetry monitoring system of FIG. 1 according to various embodiments of the present disclosure.

Turning now to FIG. 5, shown is a flowchart illustrating a method for obtaining samples from the magnetic resonator 103 within a confined environment to determine measurements of ambient conditions within the confinement environment, such as, for example, a sealed container (metal or non-metal) a sealed package (metal or non-metal), a human body, an animal, food, and/or other appropriate type of containment where a signal has to go through permeable matter.

At reference numeral 503, the magnetic resonator 103 is disposed within a confined environment for a particular application. In one non-limiting example, assume that the application relates to monitoring the environmental conditions within a sealed container including hazardous materials. The magnetic resonator 103 may be disposed within the unsealed container prior to sealing. The magnetic resonator 103 may be disposed along an interior wall, the top of a lid, the bottom portion of the container, and/or any other appropriate location within the container. In another non-limiting example, assume that the application relates to core body temperature monitoring of a human patient undergoing a surgical procedure. The magnetic resonator 103 may be disposed within the body of the human. The magnetic resonator 103 may be ingested, attached to an esophageal tube that is inserted into the human body, attached to an earpiece that is inserted into an ear canal of the human, and/or any other appropriate way to position the magnetic resonator 103 within the human body.

At reference numeral 506, the interrogating antenna 106 is remotely positioned outside of the confined environment (e.g., sealed container, human body, etc.) within the inductive coupling range of the magnetic resonator 103 that is positioned wirelessly within the confined environment. For example, if core body temperature of a human patient undergoing a surgical procedure is to be monitored, the interrogating antenna 106 may be placed between the patient and the surgical table.

At reference numeral 509, the interrogating antenna 106 transmits pulsed power signals during the transmit cycle ($T_x$) to the magnetic resonator 103. The signals may be generated by an RF signal generator 1215 (FIG. 12) of the computing device 109 that is coupled to the interrogating antenna 106. The transmitted power signals may be received by the magnetic resonator 103 via inductive coupling. At reference number 512, if the magnetic resonator 103 is not fully energized, the transmit cycle continues as the interrogating antenna 106 continues to transmit the pulsed power signals. If the magnetic resonator 103 is fully energized, the magnetic resonator 103 releases the stored energy back, and at reference numeral 515, the interrogating antenna 106 receives the released energy in the form of a resonant response signal. This relates to the receive cycle (Rx) of the interrogating antenna 106.

At reference numeral 518, the received resonant response signal is sent to the computing device 109 for processing. At reference numeral 521, the computing device processes the resonant response signal. At reference numeral 524, the resonant frequency of the resonant response signal is compared to the frequency of a previous resonance response signal sample to determine whether the resonant frequency response is at it's peak. If the resonant frequency is higher than the previous resonance response signal sample, the process, starting at reference numeral 509 is repeated to acquire additional samples. If the resonant frequency is lower than the previous resonance response signal sample, then at reference numeral 527 the previous high peak signal data is correlated with stored ambient condition values in the data store (database) 1203 to determine the appropriate measurements of the conditions within the confined environment.

Measurements and Monitoring of Materials within Sealed Containers

One non-limiting example application of the telemetry monitoring system 100 relates to the monitoring of hazardous materials within sealed containers. Large industrial complexes at commercial and government facilities across the country continue to produce byproduct hazardous materials as part of routine operations, decommissioning or remediation activities. These materials can be categorized as chemical, biological, or radioactive in nature and require proper handling, storage, transport, and disposal with adherence to applicable codes and regulations. Producers of hazardous materials include, for example, the Department of Defense (biological, chemical, and radioactive), the Department of Energy (biological, chemical, and radioactive), government contractors (biological, chemical and radioactive), healthcare providers (biological, chemical, and radioactive), chemical or pharmaceutical companies (mostly biological and chemical), and the nuclear industry (mostly chemical and radioactive).

As a result of over decades of operations, various radioactive, biological, and chemical materials have been generated, and are stored and transported in a variety of sealed metal containers. These sealed metal containers include a myriad of designs from standard drum packages to custom design stainless steel canisters suitable to accommodate the hazardous contents. These sealed metal containers are typically shipped via road or rail to regulated storage or disposal facilities across the country, and/or several governments or privately owned processing facilities for treatment and repackaging into other waste forms or by products, and to final disposal. The whole process to manage, handle, store, transport, process, dispose of hazardous materials and operations at these facilities must comply with a myriad of requirements consistent with federal and local regulations and guidelines, including CFR, OSHA, and RCRA, among others, to minimize the risk to workers, the public, and the environment.

Historically, there have been numerous occurrences involving seal failures of metal containers with hazardous content during transportation and storage (short and long term). These occurrences denote the dangers associated to hazardous materials and particularly highlighting the need for regulations and safety standards to achieve the highest possible level of security and safety as well as optimum environmental conditions during transportation and storage.

Besides the container or canister itself, the most critical component to isolate and seal hazardous contents inside a container is the closure system. These "closure systems" can vary from typical clamp or screw caps mounted on top or near the top of industry standard metal drums (e.g., a 55 Gallon drum with bolted clamp and lid) as it is common in packaging of hazardous materials for industrial processing to a more advanced custom designed canister system with a welded lid closure to hermetically contain more hazardous contents like radioactive materials such as spent nuclear fuel or high level wastes dry storage canisters used in the nuclear power industry. For the most part, these "closure systems" are designed to achieve an airtight seal confinement to secure and isolate hazardous materials from the environment, thus minimizing any potential leakage that may harm the public and the environment.

There is a direct correlation between the temperature inside a pressurized waste container and the effectiveness of its confinement barrier to secure hazardous contents. This is important when considering that some hazardous contents (chemical, biological, and radioactive) can generate significant amount of heat and pressure, and represents a particular concern during accident and/or off-normal conditions that can result in unwanted stresses to the sealed metal container and its closure system.

Temperature and pressure monitoring is an effective method to ensure or validate the stability of hazardous content and the adequacy of the containment and confinement barriers of the sealed container and its closure system. Primarily temperature measuring is a common industry practice, whereby measuring the temperature of the container outer surface can be correlated to the ambient temperature inside the container. Traditionally, direct measurement of the temperature and pressure inside the container requires access ports or penetrations to the confinement barrier to run necessary conduits or wiring to connect measuring equipment to sensors inside the container.

Direct measurement of the temperature and pressure inside of a hermetically sealed metal container poses many challenges, since in many situations it is difficult and costly to install temperature sensors that can withstand the harsh environments inside the metal container, especially on those applications involving heat generating and highly radioactive contents. Also, perforations or intrusions to the container's structure or closure lid could jeopardize the integrity of the sealed confinement system. This is important because known thermometry and pressure sensors require some kind of wire connection or physical connection to receive power and collect and transfer data to an external computer processing unit. Furthermore, RF signals in known RF technologies are of higher frequencies and are known to attenuate near large metal objects.

Figure 6:
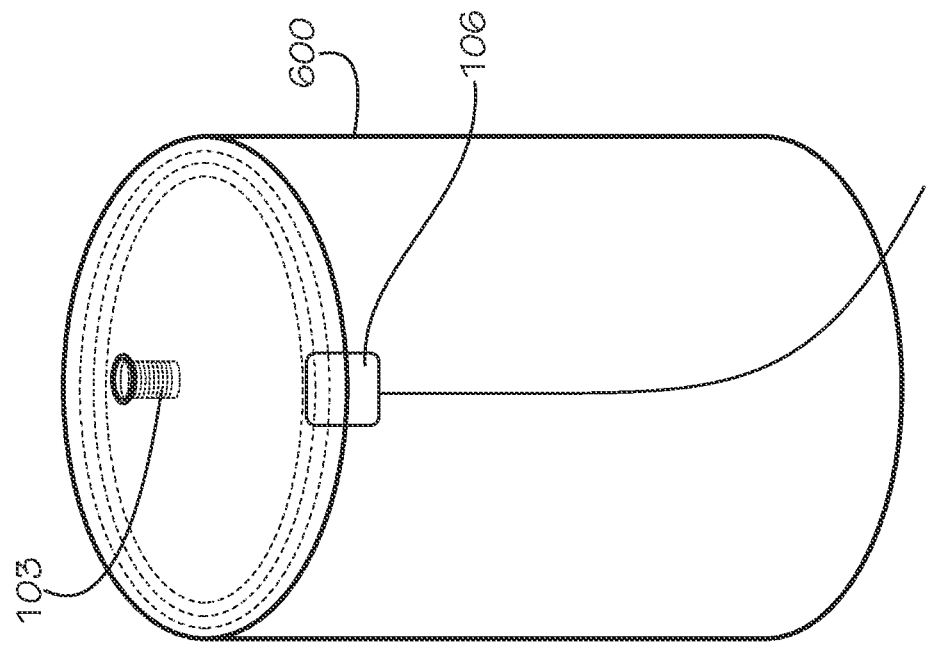
FIG. 6 is a drawing of an example of an application of the telemetry monitoring system of FIG. 1 in associated with a sealed container according to various embodiments of the present disclosure.
Figure 7:
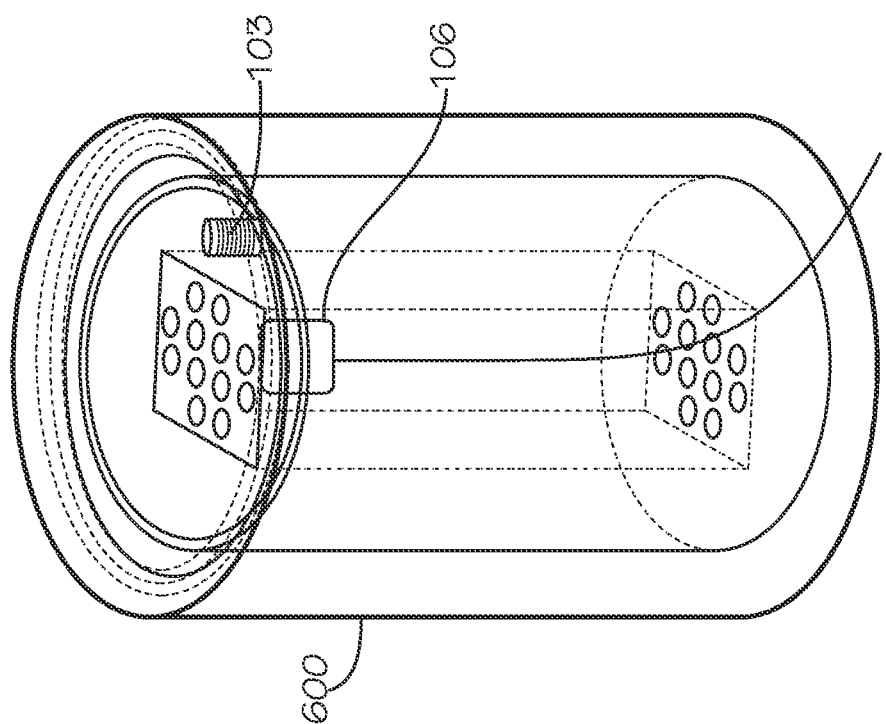
FIG. 7 is a drawing of an example of an application of the telemetry monitoring system of FIG. 1 in associated with a sealed container according to various embodiments of the present disclosure.

The methods and systems of the present disclosure may be used for wireless thermometry and pressure monitoring within sealed confinement systems. FIGS. 6 and 7 illustrate examples of drawings of the magnetic resonator 103 securely attached within a sealed container 600 including nuclear fuel according to various embodiments of the present disclosure. While the sealed container 600 of FIGS. 6 and 7 illustrates a nuclear fuel cask, it should be noted that the magnetic resonator 103 may be disposed within other types of sealed containers, such as, for example, a paint can, a container or canister equipped with RF enabled filter systems and/or vent filter systems, and/or any other suitable type of container or canister. The interrogating antenna 106 may be disposed along an exterior portion of the sealed cask 600. In some embodiments, the interrogating antenna 106 is positioned directly onto the outside of the sealed container 600. In other embodiments, the interrogating antenna 106 is positioned near the outside of the sealed container 600 based in part on the inductive coupling range with the magnetic resonator 103. The interrogating antenna 106 is coupled to a computing device 109 (not shown). The interrogating antenna 106 emits energy pulses at a desired frequency for energizing the magnetic resonator 103 within the sealed container 600.

By attaching the magnetic resonator 103 of the telemetry monitoring system 100 within the sealed container 600, the magnetic resonator 103 may wirelessly transmit a signal response back to the interrogating antenna 106 positioned outside the sealed cask 600. In some embodiments, the telemetry monitoring system 100 uses low frequency bands (between about 10 Khz and below about 300 kHz) which are known to be more effective near fluids and metals. In other embodiments, the telemetry monitoring system 100 may operate at higher frequencies used by standard RFID systems, such as, for example 13.56 MHz RFID systems.

The systems and methods of the present disclosure differ from known systems and methods for temperature and pressure monitoring of sealed containers for a variety of reasons. For example, the systems and methods of the present disclosure use passive radio frequency identification (RFID) technology with no physical connection (wireless) to the outside of the canister. Therefore, no penetrations to the confinement boundary are necessary. Furthermore, the magnetic resonator 103 does not contain moving parts which minimizes the need for hardware calibration in the field.

The components of the magnetic resonator 103 can maintain performance under hazardous conditions including high temperature and radiation environments. In preferred embodiments, the magnetic resonator 103 does not include an integrated circuit (IC) and/or silicon IC chip. Known industry standard RFID tags offer read/write capabilities enabled by an onboard integrated circuit or silicon chip. IC chips use electrical pulses to produce digital data for identification purposes, which are useful for asset tracking applications. However, integrated circuits systems are expensive and can easily degrade when placed in hazardous environments, directly exposed to radiation, heat, pressure or harmful chemicals.

Measurements and Monitoring of Patients Undergoing Medical Procedures

Another non-limiting application of the systems and methods of the present disclosure includes thermometric monitoring of patients undergoing medical procedures. Most clinically known thermometers accurately report the body temperature when in direct contact with the tissue being measured. The difficulty is that there are no known reliable core-temperature measuring locations where thermometers could be placed without being completely non-invasive and without some impact to operating procedures, especially in surgical patients under regional and general anesthesia where core body temperature monitoring and body thermoregulation is critical to meet standard operating protocols.

Throughout the entire patient care continuum, core body temperature is normally tightly regulated. Many drugs and almost all regional and general anesthetics produce a profound dose-dependent reduction in the core temperature triggering cold defenses including arterio-venous shunt vasoconstriction and shivering. Hypothermia in most patients can be the result of anesthetic-induced impairment of normal thermoregulatory control, and the resulting core-to-peripheral redistribution of body heat. Furthermore, neuraxial anesthesia may impair thermoregulatory control. As such, achieving core temperature normothermia is a standard of care in surgical patients under regional and general anesthesia and those under constant monitoring home care programs.

Another important factor in thermoregulatory control is related to the operating room (OR) conditions and the patient surgical procedures. Surgery typically involves exposure to a cold environment, administration of unwarmed intravenous fluids, and evaporation from within surgical incisions. In fact, hypothermia is more common in unwarmed surgical patients with defective thermoregulatory defenses. Monitoring patient core-temperature can help eliminate risk for hypothermia, lower the risk of surgical site infections, and minimize post anesthesia recovery.

Furthermore, the importance of maintaining the temperature of the newborn baby has been known for centuries, starting with the work of Soranus of Ephesus (98-131AD), followed by Tarnier and Budin in the 19th century and William Silverman in the 1950s. Thermographs of a newborn babies provide a clear understanding of the wide variation in temperature throughout the body. The core temperature is not constant in all tissues and organs, with the brain probably having the highest need for temperature and regulation requirements. As such, it is difficult to know which temperature to measure. Also, the measurement of a single temperature helps to understand how babies are able to maintain core-temperature, but cannot give any information on the energy being used for thermoregulation. Newborn babies and infants have a very narrow normothermia window. If a baby or infant is exposed to cold stress, peripheral parts of the body will cool before more central core temperatures drop. By measuring a central (core temperature) and a peripheral temperature (skin or body shell temperature), changes in the central-peripheral temperature difference give an early indication of thermal stress, long before any alteration is seen in the central temperature of the body.

Body temperature varies throughout parts of the body: thoracic, abdominal, and central nervous system temperatures and usually range from 2 to 4° C. cooler than the human extremities (arms and legs). Skin temperature can be much cooler and may vary as a function of direct environmental exposure. Core temperature, while by no means completely characterizes body heat content and distribution, is the best single indicator of thermal status in humans.

Core temperature monitoring is appropriate during most general anesthetics procedures both to facilitate detection of malignant hyperthermia and to quantify thermal disturbances during a clinical operating procedure (hyperthermia and hypothermia). Core temperature monitoring (e.g., tympanic membrane, pulmonary artery, distal esophagus, nasopharynx, etc.) is used to monitor intraoperative hypothermia, prevent overheating, and facilitate detection of malignant hyperthermia (MH). Because these sites are not readily available by non-invasive means, a variety of known "near-core" sites used clinically (e.g., mouth, axilla, bladder, rectum, skin surface, etc.), and are known to have distinct limitations and compromises regarding efficacy and ease of use in surgical settings.

A high level of accuracy is clinically necessary to establish the best thermoregulatory protocol and avoid temperature variations associated with hypothermia-induced complications. The most common perioperative thermal disturbance is inadvertent hypothermia. Prospective, randomized trials have shown that even mild hypothermia causes numerous adverse outcomes in a variety of patient populations. Hypothermia-induced complications include morbid myocardial outcomes secondary to sympathetic nervous system activation, surgical wound infection, coagulopathy increased allogeneic transfusions, negative nitrogen balance, delayed wound healing, delayed post-anesthetic recovery, prolonged hospitalization, shivering, and patient discomfort.

Body temperature should be monitored in most patients undergoing general anesthesia exceeding thirty minutes in duration and in all patients whose surgery lasts longer than one hour. Measuring body temperature (and maintaining normothermia) is the known standard-of-care during prolonged general anesthesia, especially for large operations where the risk of hypothermia is substantial. Core body temperature should also be measured during regional anesthesia in patients likely to become hypothermic, including those undergoing body cavity surgery.

Central thermoregulatory control is slightly impaired by neuraxial anesthesia, but this is combined with reduced gain and maximum response intensity of shivering. Autonomic impairment is compounded by an impairment of behavioral regulation so that patients do not recognize that they are hypothermic. The result is that patients undergoing neuraxial anesthesia typically become hypothermic and do not sense the hypothermia. As such, temperature be measured in patients having major surgery under regional anesthesia and general anesthesia, and they should be actively warmed as necessary to maintain normothermia. All known systems and methods use wired or battery power temperature sensors with or without precision gages requiring periodic calibration and requiring placement at invasive locations through the body, which can yield to a lower patient care and limited accuracy and ease of use, representing a latent industry concern.

The systems and methods of the present disclosure may be used to non-invasively monitor thermoregulatory behaviors in humans under clinical care during inpatient or outpatient care and during home care. Wirelessly measuring peripheral temperature (skin) and deep core body temperature (thermal compartment via tympanic membrane, pulmonary artery, distal esophagus, and nasopharynx) can be achieved using a low frequency passive magnetic resonator 103 attached to a skin patch, ingested, and/or inserted within the body for appropriate measurement. The skin patch may be used to measure vasodilation associated with sweating and the intense vasoconstriction, both equally important along with deep sternal core body temperature. An interrogating antenna 106 positioned near the body may receive signals from the magnetic resonator 103 that can be analyzed to identify capacitive characteristic changes of the magnetic resonator 103 and determine body temperature measurements correlating to the body.

There are no known prior methods to measure core body temperature for clinical settings using wireless and passive low frequency magnetic resonators by means of analyzing the capacitive characteristic changes of a magnetic resonator 103 placed near the body's thermal source such as skin temperature and deep core body temperature (thermal compartment via tympanic membrane, pulmonary artery, distal esophagus, and nasopharynx). All known temperature sensors use wired and/or battery power temperature sensors with or without precision gages requiring periodic calibration and in most cases requiring placement at invasive locations through the body, which can yield to a lower patient care and limited accuracy and ease of use, representing a latent industry concern.

Passively and wirelessly transferring real-time temperature data directly from the heat source would be ideal to improve thermoregulatory protocols in surgical patients and those in rigorous home care programs. Other factors to consider regarding passive RF thermometry may include higher accuracy or resolution of core body temperature, wireless continuous temperature monitoring, improved safety (as it's less invasive and no contact can avert infections), and reduced costs. The systems and methods of the present disclosure related to the use a low frequency passive magnetic resonator 103 to achieve a more efficient thermometry method helps physicians, home care clinicians, and the overall consumer population meet their thermal management needs during temperature monitoring procedures.

Figure 8:
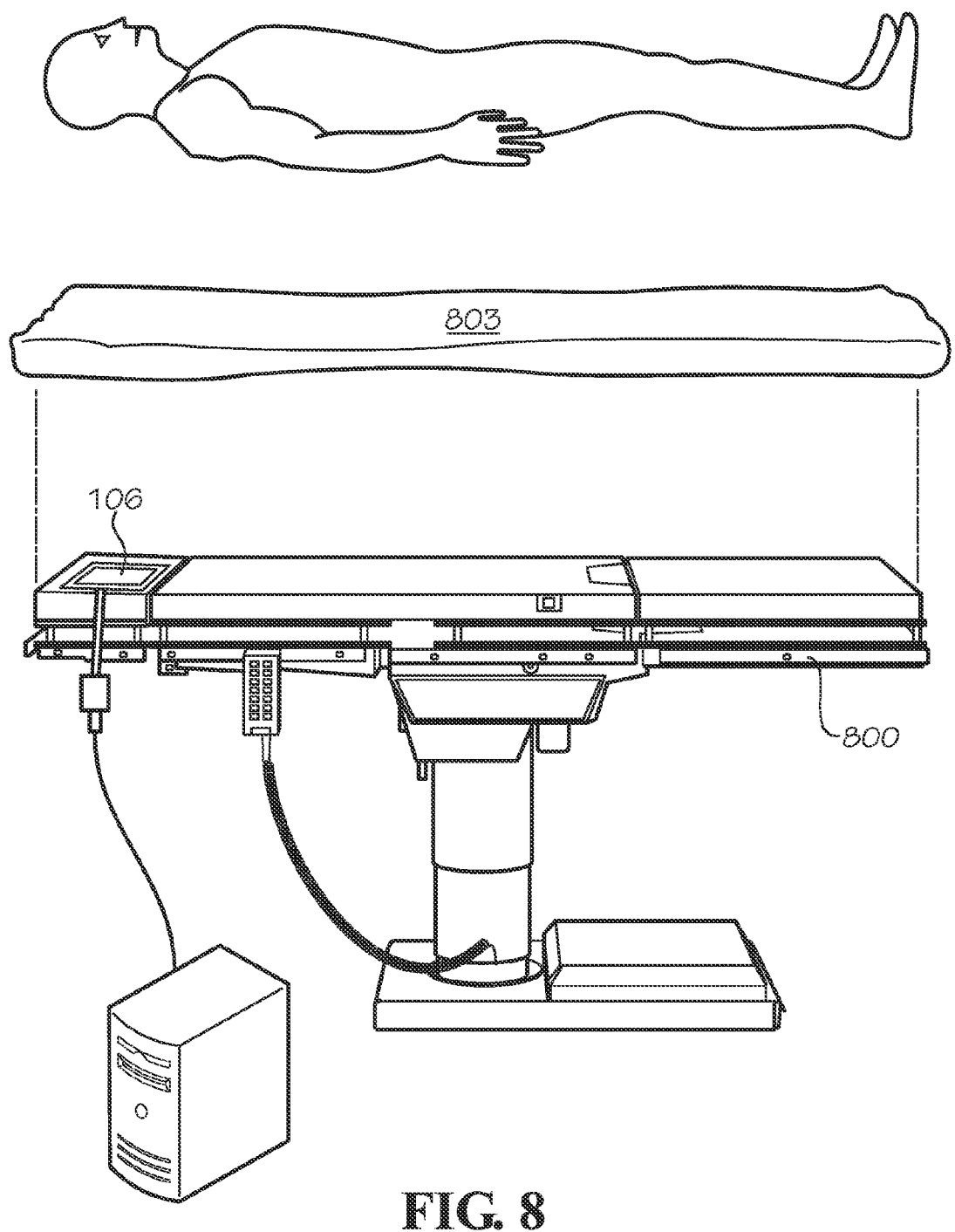
FIG. 8 is a drawing of an example of an application of the telemetry monitoring system of FIG. 1 in association with a surgical patient according to various embodiments of the present disclosure.

Turning now to FIG. 8 shown is an example of a drawing of an expanded view of the telemetry monitoring system 100 in an assembled stated for monitoring core body temperature of a surgical patient according to various embodiments of the present disclosure. Specifically, FIG. 8 illustrates a surgical patient lying on a table 800. The interrogating antenna 106 is positioned on the surgical table below a surgical drape 803. The interrogating antenna 106 can also be embedded into a skin patch, or molded into disposable devices such as esophageal tubes, ear piece for temperature reading of Tympanic membrane.

Figure 9:
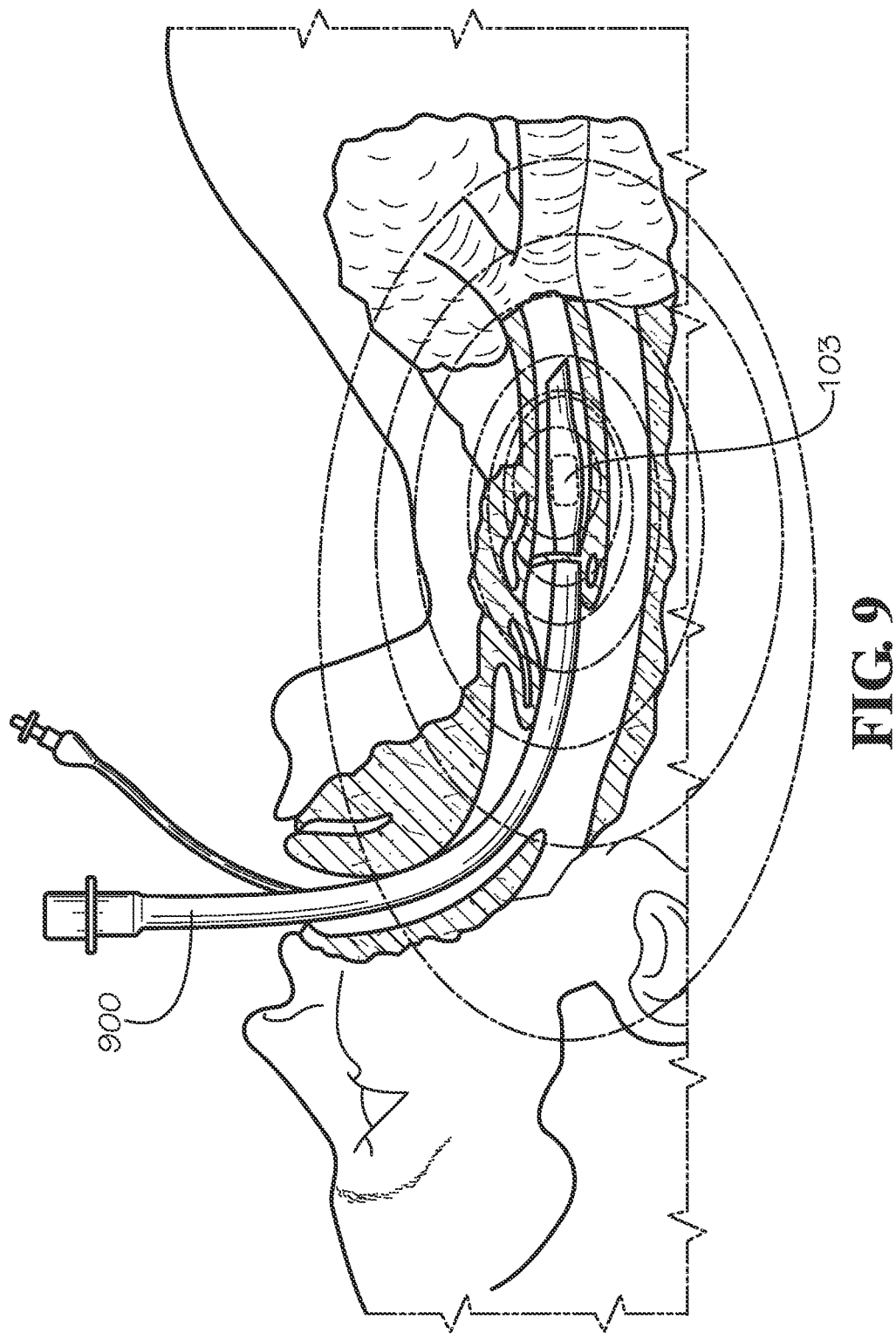
FIG. 9 is a drawing of an example of the magnetic resonator of FIG. 1 being positioned within a confined embodiment via an esophageal tube according to various embodiments of the present disclosure.
Figure 10:
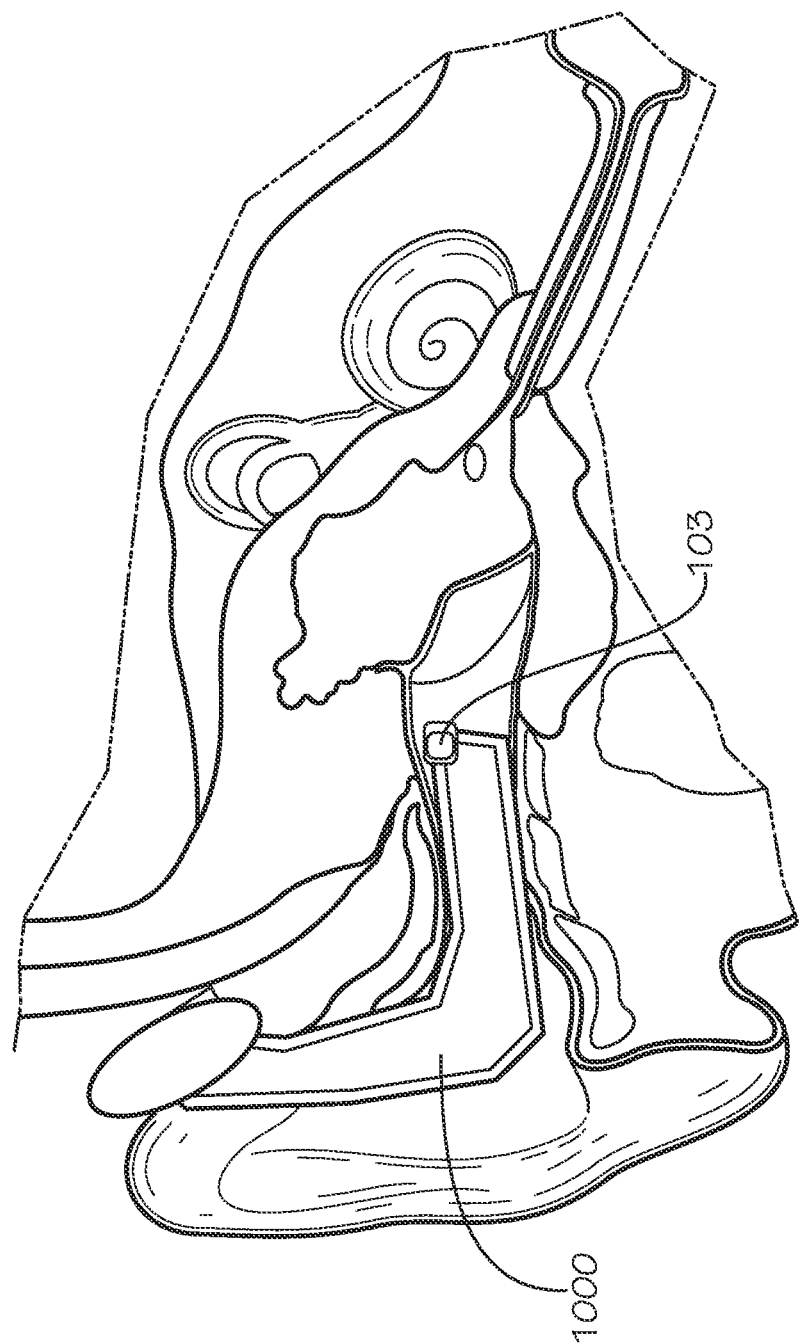
FIG. 10 is a drawing of an example of the magnetic resonator of FIG. 1 being positioned within a confined embodiment via an ear device according to various embodiments of the present disclosure.
Figure 11:
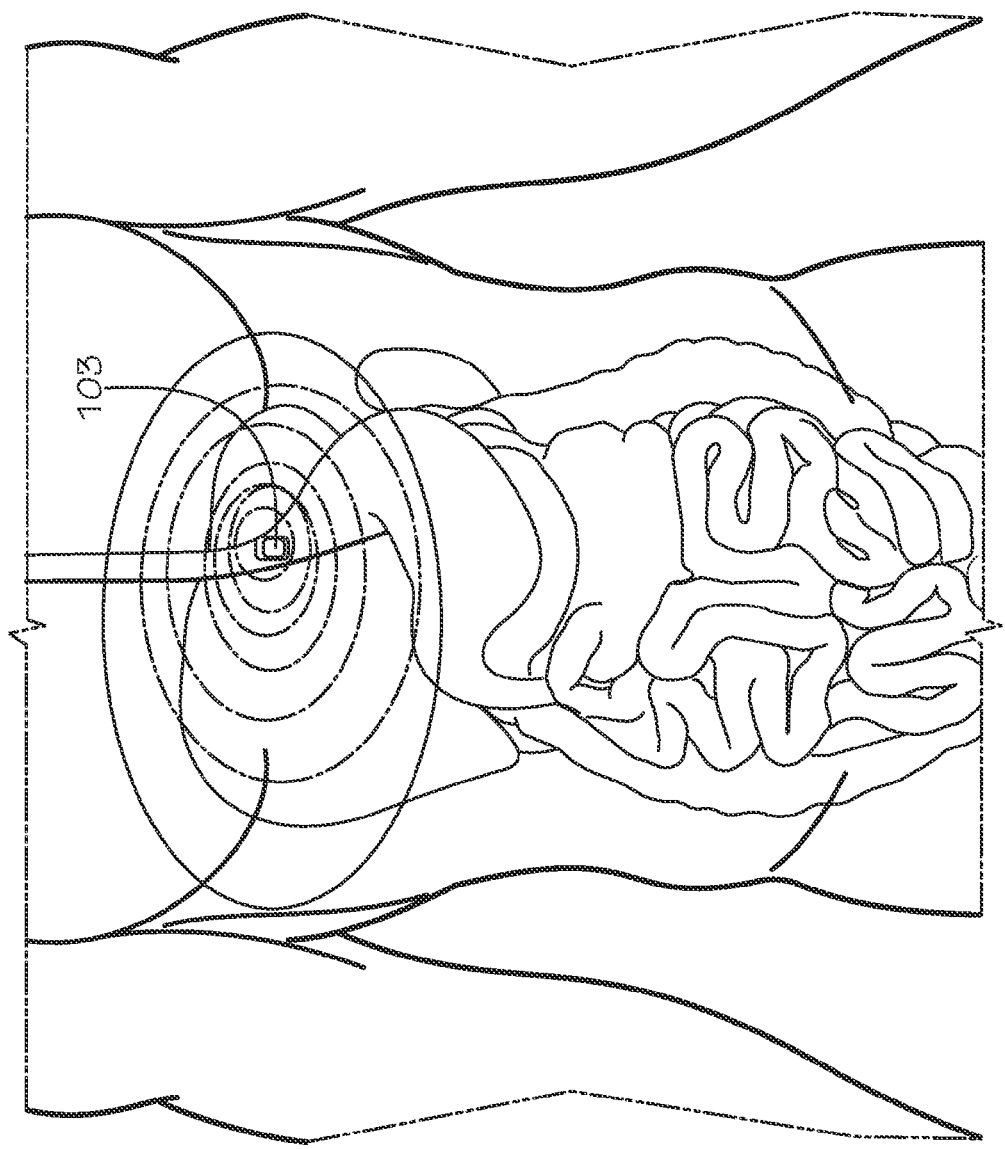
FIG. 11 is a drawing of an example of the magnetic resonator of FIG. 1 being positioned within a confined embodiment via ingestion by a human according to various embodiments of the present disclosure.

The interrogating antenna 106 may be coupled to the computing device 109 via a wire or wirelessly. While the magnetic resonator 103 is not shown within the body of the surgical patient in FIG. 8, the magnetic resonator 103 may be disposed within the body in a variety of ways depending on the procedure. FIGS. 9, 10, and 11 each provide an example of placement of the magnetic resonator.

FIG. 9 illustrates an example of a drawing of the magnetic resonator 103 attached to an esophageal tube 900 inserted within a patient's body. FIG. 10 illustrates an example of a drawing of a magnetic resonator 103 attached to an ear piece 1000 that is embedded within a patient's ear canal according to various embodiments of the present disclosure. FIG. 11 illustrates an example of a drawing of an ingested magnetic resonator 103 positioned within a patient's body according to various embodiments of the present disclosure.

Figure 12:
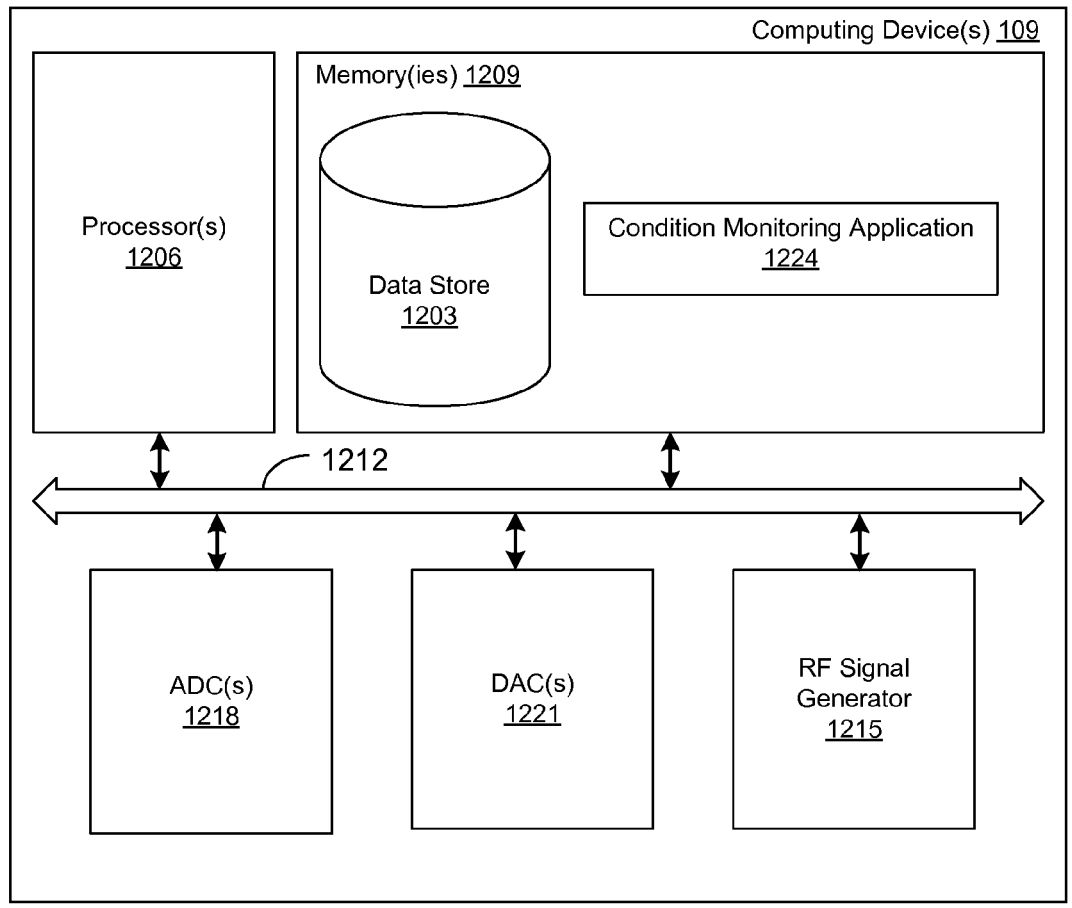
FIG. 12 is a schematic block diagram that provides one example illustration of a computing device employed in the telemetry monitoring system of FIG. 1 according to various embodiments of the present disclosure.

With reference to FIG. 12, shown is a schematic block diagram of the computing device 109 according to an embodiment of the present disclosure. The computing device 109 includes at least one processor circuit, for example, having a processor 1206 and a memory 1209, both of which are coupled to a local interface 1212. To this end, the computing device 109 may comprise, for example, at least one computer or like device. The computing device 109 can also comprise an RF signal generator 1215, one or more analog-to-digital converter(s) (ADC) 1218, one or more digital to analog converters 1221 (ADC), one or more digital signal processing modules (not shown) and/or any other appropriate type of device, all of which are coupled to the local interface 1212. The local interface 1212 may comprise, for example, a data bus with an accompanying address/control bus or other bus structure as can be appreciated.

Stored in the memory 1209 are both data and several components that are executable by the processor 1206. In particular, stored in the memory 1209 and executable by the processor 1206 is a condition monitoring application 1224, and potentially other applications. The condition monitoring application 1224 may be executed to initiate the frequency sweep algorithm, determine condition values based at least in part on signal responses, analyze the resonant signal responses, etc. Also stored in the memory 1209 may be a data store 1203 and other data. In addition, an operating system may be stored in the memory 1209 and executable by the processor 1206.

A number of software components are stored in the memory 1209 and are executable by the processor 1206. In this respect, the term "executable" means a program file that is in a form that can ultimately be run by the processor 1206. Examples of executable programs may be, for example, a compiled program that can be translated into machine code in a format that can be loaded into a random access portion of the memory 1209 and run by the processor 1206, source code that may be expressed in proper format such as object code that is capable of being loaded into a random access portion of the memory 1209 and executed by the processor 1206, or source code that may be interpreted by another executable program to generate instructions in a random access portion of the memory 1209 to be executed by the processor xxx, etc. An executable program may be stored in any portion or component of the memory 1209 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1209 is defined herein as including both volatile and nonvolatile memory and data storage components. Volatile components are those that do not retain data values upon loss of power. Nonvolatile components are those that retain data upon a loss of power. Thus, the memory 1209 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1206 may represent multiple processors 1206 and/or multiple processor cores and the memory 1209 may represent multiple memories 1209 that operate in parallel processing circuits, respectively. In such a case, the local interface 1212 may be an appropriate network that facilitates communication between any two of the multiple processors 1206, between any processor 1206 and any of the memories 1209, or between any two of the memories 1209, etc. The local interface 1212 may comprise additional systems designed to coordinate this communication, including, for example, performing load balancing. The processor 1206 may be of electrical or of some other available construction.

Although the condition monitoring application 1224, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Although the flowchart of FIG. 5 shows a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. Further, in some embodiments, one or more of the blocks shown in FIG. 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the condition monitoring application 1224 that comprises software or code can be embodied in any non-transitory computer-readable medium for use by or in connection with an instruction execution system such as, for example, a processor 1206 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

The above-described embodiments of the present disclosure are merely examples of implementations to set forth a clear understanding of the principles of the disclosure. Many variations and modifications may be made to the above-described embodiments without departing substantially from the spirit and principles of the disclosure. All such modifications and variations are intended to be included herein within the scope of this disclosure. Disjunctive language used herein, such as the phrase "at least one of X, Y, or Z," unless specifically stated otherwise, is used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Therefore, the following is claimed:

1. A telemetry monitoring system, comprising:
   a magnetic resonator disposed within a confined environment;
   an interrogating antenna inductively coupled to the magnetic resonator, the interrogating antenna situated outside the confined environment and configured to emit one or more energizing signals to wirelessly energize the magnetic resonator, wherein a condition associated with the confined environment is determined based at least in part on a resonant signal response of the magnetic resonator received by the interrogating antenna from the magnetic resonator in response to the magnetic resonator being energized; and
   a computing device coupled to the interrogating antenna, wherein the computing device comprises:
      a processor in data communication with a memory;
      a radio frequency (RF) generator that is configured to generate the one or more energizing signals emitted from the interrogating antenna; and
      a condition monitoring application executable in the computing device, the condition monitoring application being configured to at least:
         determine, via the computing device, whether a resonant frequency of the resonant signal response resonating from the magnetic resonator is higher than a prior resonant frequency of the magnetic resonator; and
         in response to determining that the resonant frequency of the magnetic resonator is higher than the prior resonant frequency, determine, via the computing device, a condition value of the condition based at least in part on a comparison with the resonant frequency and a predefined correlation table.

2. The telemetry monitoring system of claim 1, wherein the magnetic resonator operates at a frequency between 10 kHz to 300 kHz.

3. The telemetry monitoring system of claim 1, wherein the magnetic resonator operates at a frequency of 13.56 MHz.

4. The telemetry monitoring system of claim 1, wherein a permeability of the magnetic resonator is greater than an air-core.

5. The telemetry monitoring system of claim 1, wherein the one or more energizing signals are emitted at different frequencies.

6. The telemetry monitoring system of claim 1, wherein the magnetic resonator comprises a conducting material disposed along at least a portion of a magnetic core.

7. The telemetry monitoring system of claim 6, wherein the conducting material comprises a wire coil.

8. The telemetry monitoring system of claim 6, wherein the magnetic core comprises at least one of: a powder core, a ferrite core, a metglas core, an amorphous material, or a permalloy core.

9. The telemetry monitoring system of claim 6, wherein the magnetic resonator further comprises an encapsulant substantially surrounding the magnetic core and conducting material, wherein the encapsulant comprises at least one of a thermal expansion glass material or a ceramic.

10. The telemetry monitoring system of claim 6, wherein the magnetic resonator further comprises a balancing capacitor in parallel with the magnetic core and conducting material.

11. The telemetry monitoring system of claim 1, wherein the condition comprises at least one of: temperature, pressure, or humidity.

12. A method of measuring one or more ambient conditions of a confined environment, the method comprising:
   emitting one or more energizing signals via an interrogating antenna situated outside the confined environment;
   energizing a magnetic resonator disposed within the confined environment via the one or more energizing signals emitted from the interrogating antenna, the interrogating antenna being inductively coupled to the magnetic resonator;
   determining, via a computing device, the one or more ambient conditions associated with the confined environment based at least in part on an analysis of one or more resonant signal responses resonated by the magnetic resonator;
   receiving, via the interrogating antenna, the one or more resonant signal responses from the magnetic resonator in response to the magnetic resonator being energized; and
   sending, via the interrogating antenna, the one or more resonant signal responses to the computing device.

13. The method of claim 12, wherein the one or more ambient conditions are determined in response to resonance frequency shift linearity emitted by the magnetic resonator due to changes in the one or more ambient conditions of the confined environment.

14. The method of claim 12, further comprising analyzing, via the computing device, at least one of: a resonant frequency associated with the one or more resonant signal responses, an amplitude associated with the one or more resonant signal responses, a quality (Q) factor associated with the one or more resonant signal responses, or one or more capacitance characteristics associated with the one or more resonant signal responses.

15. The method of claim 12, wherein the magnetic resonator operates at a frequency between 10 kHz and 300 kHz.

16. The method of claim 12, wherein the magnetic resonator operates at a frequency of 13.56 MHz.

17. The method of claim 12, further comprising determining, via the computing device, the one or more ambient conditions associated with the confined environment based at least in part on the analysis and a predefined correlation table.

18. The method of claim 12, wherein the magnetic resonator is a passive device.

19. The method of claim 12, wherein the magnetic resonator operates at a frequency below 10 kHz.

20. The method of claim 12, wherein the confined environment is a sealed metal container comprising a hazardous material.

21. The method of claim 12, wherein the confined environment is a human body.

22. The telemetry monitoring system of claim 1, wherein the condition is determined in response to resonance frequency shift linearity emitted by the magnetic resonator due to changes in the conditions of the confined environment.

* * * * *